Oct. 11, 1927. F. H. LEIDECKER Re. 16,768

METHOD OF MAKING SPIRAL AUGER STEMS, SPIRAL BITS, AND SPIRAL SUBSTITUTES

Original Filed Aug. 28, 1924

F. H. Leidecker
Inventor,

By C. A. Snow & Co.
Attorneys.

Reissued Oct. 11, 1927. Re. 16,768

UNITED STATES PATENT OFFICE.

FOSTER H. LEIDECKER, OF MARIETTA, OHIO, ASSIGNOR TO THE LEIDECKER TOOL COMPANY, OF MARIETTA, OHIO.

METHOD OF MAKING SPIRAL AUGER STEMS, SPIRAL BITS, AND SPIRAL SUBSTITUTES.

Original No. 1,543,608, dated June 23, 1925, Serial No. 734,713, filed August 28, 1924. Application for reissue filed April 23, 1926. Serial No. 104,238.

This invention relates to a method of producing spiral auger stems, spiral bits, and spiral substitutes, one of the objects of the invention being to expedite and cheapen the production by avoiding the slow and costly processes heretofore followed and which have required the construction of the articles from cast steel, the planing and milling of the spiral flutes or the formation of the wings or flutes by the use of hand fullers.

With the foregoing and other objects in view the invention consists in first shaping a steel billet so as to provide it with longitudinally extending wings after which by the use of suitably shaped dies, a desired twist is imparted to the rolled billet so as to form spiral wings.

The invention also consists in shaping the ends of the billet prior to the twisting operation so as to produce the usual end collars, also the box and pin and wrench square.

The invention also consists in certain novel steps of the method hereinafter more fully disclosed and pointed out in the claims, it being understood that various changes may be made therein without departing from the spirit of the invention as claimed.

In the accompanying drawings has been shown the means employed for carrying out the several steps of the method and the produced article has also been illustrated in the different stages of production.

In said drawings.

Figure 1:
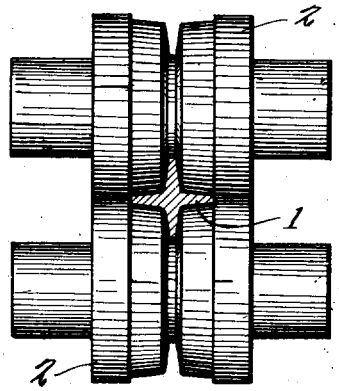
Figure 1 is an elevation of a pair of rolls in the process of shaping a steel billet during the first step of the method.
Figure 2:
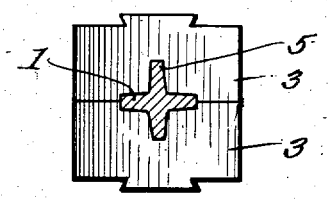
Figure 2 is an elevation showing a pair of dies that can be used in lieu of the rolls for carrying out the first step of the method.
Figure 3:
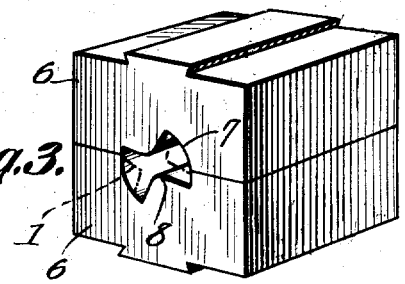
Figure 3 is a perspective view of a pair of dies used in imparting a twist to the wings.
Figure 4:
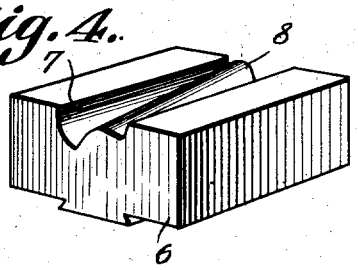
Figure 4 is a perspective view of the lower die of the pair.
Figure 5:
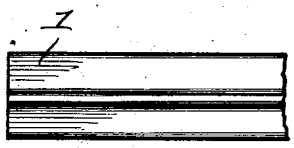
Figure 5 is a side elevation of the billet at the completion of the first step of the process.

In carrying out the method a billet of steel is first made cruciform in cross section as shown at 1. This can be done either by passing the billet between two properly shaped die rolls 2 or by forging it between two properly shaped dies 3 operated by air, hydraulic or steam pressure. Where dies 3 are used the billet is fed longitudinally between the dies during successive operations thereof so as to be properly shaped throughout its length. After the billet has been made of cruciform cross section the ends thereof are pressed, forged or otherwise shaped to produce cylindrical collars 4 of such size as to permit the use of the usual box, pin, collar and wrench square. At this stage of the operation the billet has the appearance disclosed in Figure 6. The next operation consists in subjecting the billet to successive compressions from a pair of dies designed to impart a twist to the wings 5 of the billet. For this purpose dies such as shown in Figures 3 and 4 are employed. The two dies are preferably duplicates and are superposed. Each die includes a block 6 having a longitudinal channel 7 in one face adapted to receive one-half of the partially shaped article. The walls of the channel are rounded and formed in the channel is a fuller 8, extending obliquely throughout the length of the channel. For about half the length of the fuller the transverse area thereof corresponds with the space existing between any two adjacent wings 5 while the remainder of the fuller tapers off until it reaches a minimum cross section of about one-third the cross section of the fuller at the other end of the die. Throughout the tapered portion of the fuller any cross section is in exact proportion to the cross section of the fuller at the large end thereof. It is to be understood, however, that while this is the preferred construction modifications thereof can be used if desired.

Figure 6:
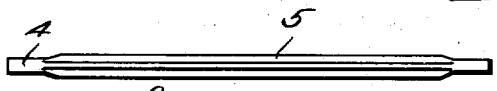
Figure 6 is a side elevation of the billet at the completion of the second step of the process.
Figure 7:
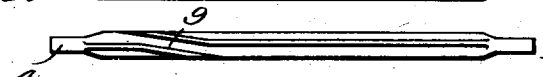
Figure 7 is a side elevation of the billet after the completion of the third step of the process.
Figure 8:
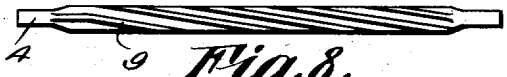
Figure 8 is a side elevation of the billet when formed into a complete auger stem or substitute.
Figure 9:
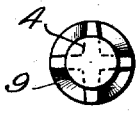
Figure 9 is an end elevation on an enlarged scale of the completed article.

When the billet shown in Figure 6 is placed with one end portion of its wings between the dies 6 and said dies are forced together under pressure, the fullers will cooperate to impart a twist to the article so that the wings will be slightly spiral at one end, as shown at 9 in Figure 7. The dies are then separated, the article therebetween is given a partial turn and held while these dies are again brought together. After the article has thus been given a partial twist by the dies it is shifted longitudinally relative to the dies and held against rotation by the lower member of the dies while the dies are again brought together. Thus a further twist is imparted to the article and the spiral portions of the wings are made longer. This operation is repeated until the full length of the winged portion of the article has been acted upon by the dies 6 whereupon the completed auger stem or substitute will be produced as shown in Figures 8 and 9.

Figure 10:
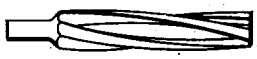
Figure 10 is a view of a spiral bit.

Although I have heretofore described the method of making spiral auger stems and spiral substitutes, it is to be understood that substantially the same method may be employed in making a spiral bit such as shown for example in Figure 10.

What is claimed is:

1. The herein described method of producing spiral auger stems and the like which consists in positioning between relatively movable dies a steel billet having longitudinal wings, intermittently feeding the billet longitudinally between the dies, each longitudinal movement being equal to or less than the length of the die, the billet being held by one of the die members against rotation at the completion of each intermittent movement, and subjecting the wings of the billet to pressure from the dies during pauses between the movements of the billet, thereby to successively twist the wings of the billet progressively from one end to the other thereof.

2. The method of making a tool stem having radial wings extending lengthwise thereof, which consists in forging a billet of rectangular cross-section into a stem substantially cruciform in cross-section, positioning the resulting wings of the stem between dies shaped to twist one set of diametrically opposite wings helically about the longitudinal axis of the stem, and then rotating said stem to bring the other set of wings between said dies.

3. The method of making a tool stem having radial wings extending lengthwise thereof, which consists in forging a billet of rectangular cross-section into a stem substantially cruciform in cross-section, immediately positioning, without further heat treating, the resulting wings of the stem between dies shaped to twist one set of diametrically opposite wings helically about the longitudinal axis of the stem, and then rotating said stem a quarter of a turn to bring the other set of wings between said dies, said stem being fed longitudinally and intermittently after the two successive twisting operations of the dies.

4. The method of making a tool stem having radial wings extending lengthwise thereof, which consists in forging a steel billet into a steam substantially cruciform in cross section, positioning the resulting wings of the stems between dies shaped to twist one set of diametrically opposite wings helically about the axis of the stem while the other set remains unchanged, and then rotating said stem to bring such other set of wings between said dies while the previously twisted wings are unacted upon, said stem being fed longitudinally through the dies only after two successive operations on the stem-wings, whereby portions of the stem from end to end thereof are successively acted upon to produce continuous and uninterrupted spiral wings thereon.

5. The method of making a tool stem having radial wings extending lengthwise thereof, which consists in forging a steel billet into a stem substantially cruciform in cross section, positioning the resulting wings of the stems between dies shaped to twist one set of diametrically opposite wings helically about the axis of the stem and then rotating said stem to bring such other set of wings between said dies, said stem being fed longitudinally through the dies only after two successive operations on the stem-wings, whereby portions of the stem from end to end thereof are successively acted upon to produce continuous and uninterrupted spiral wings thereon.

In testimony that I claim the foregoing as my own, I have hereto affixed my signature.

FOSTER H. LEIDECKER.